(12) United States Patent
Oikawa et al.

(10) Patent No.: US 9,705,427 B2
(45) Date of Patent: Jul. 11, 2017

(54) ULTRASONIC MOTOR AND LENS APPARATUS INCLUDING THE SAME

(71) Applicant: CANON KABUSHIKI KAISHA, Tokyo (JP)

(72) Inventors: Makoto Oikawa, Yokohama (JP); Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/847,494

(22) Filed: Sep. 8, 2015

(65) Prior Publication Data

US 2015/0381079 A1 Dec. 31, 2015

Related U.S. Application Data

(62) Division of application No. 13/611,281, filed on Sep. 12, 2012, now Pat. No. 9,158,083.

(30) Foreign Application Priority Data

Sep. 20, 2011 (JP) .................................. 2011-204002

(51) Int. Cl.
*H02N 2/00* (2006.01)
*H02N 2/10* (2006.01)
(Continued)

(52) U.S. Cl.
CPC ........... *H02N 2/103* (2013.01); *B06B 1/0644* (2013.01); *G02B 7/02* (2013.01); *G02B 7/04* (2013.01);
(Continued)

(58) Field of Classification Search
CPC ...... H02N 2/066; H02N 2/0055; H02N 2/103; H02N 2/0015
(Continued)

(56) References Cited

U.S. PATENT DOCUMENTS 6,094,538 A * 7/2000 Asayama ................. G02B 7/28
359/825
7,466,062 B2 12/2008 Sakatani et al.
(Continued)

FOREIGN PATENT DOCUMENTS

JP 08-182359 A 7/1996
JP 2004-153935 A 5/2004
(Continued)

OTHER PUBLICATIONS

Office Action in Japanese Patent Application No. 2011-204002, dated Jun. 30, 2015.
(Continued)

*Primary Examiner* — Thomas Dougherty
*Assistant Examiner* — Karen B Addison
(74) *Attorney, Agent, or Firm* — Fitzpatrick, Cella, Harper & Scinto

(57) ABSTRACT

A driving motor includes a member having a contact surface, a vibrator including a contact part that is brought into contact with the contact surface, a pressing unit, and a contact member located between the pressing unit and the vibrator. The vibrator and the member move relatively by a vibration of the vibrator. The pressing unit comprises an elastic member so as to apply a pressing force on the contact part against the member including the contact surface. The contact member has a curved surface portion formed as an arc shape curved toward the pressing unit, and comes into contact with the pressing unit at the curved surface portion. The curved surface portion is formed so as to locate a position of a center of a circle including the arc shape of the curved surface portion not closer to the contact member than to the contact part.

8 Claims, 7 Drawing Sheets

(51) Int. Cl.
*G02B 7/02* (2006.01)
*G02B 7/12* (2006.01)
*B06B 1/06* (2006.01)
*G02B 7/04* (2006.01)
*H02N 2/12* (2006.01)

(52) U.S. Cl.
CPC ............. *G02B 7/12* (2013.01); *H02N 2/0015* (2013.01); *H02N 2/0055* (2013.01); *H02N 2/12* (2013.01)

(58) Field of Classification Search
USPC .............. 310/323.01–323.021, 334; 359/811
IPC ..................................... H02N 2/00; G02B 7/02
See application file for complete search history.

(56) References Cited

U.S. PATENT DOCUMENTS

| | | | |
|---|---|---|---|
| 9,091,805 B2 | 7/2015 | Yamasaki et al. | |
| 9,158,083 B2 * | 10/2015 | Oikawa | G02B 7/02 |
| 2006/0113868 A1 * | 6/2006 | Sakatani | G02B 7/08 |
| | | | 310/323.17 |
| 2011/0309722 A1 * | 12/2011 | Seki | G02B 7/102 |
| | | | 310/323.16 |
| 2013/0033152 A1 | 2/2013 | Yamasaki et al. | |
| 2013/0033771 A1 | 2/2013 | Oikawa et al. | |

FOREIGN PATENT DOCUMENTS

| | | |
|---|---|---|
| JP | 2004-304887 A | 10/2004 |
| JP | 2006-158052 A | 6/2006 |
| JP | 2006-158054 A | 6/2006 |
| JP | 2011-015605 A | 1/2011 |

OTHER PUBLICATIONS

Office Action issued in Japanese Patent Application No. 2011-204022 dated Jan. 21, 2016.

* cited by examiner

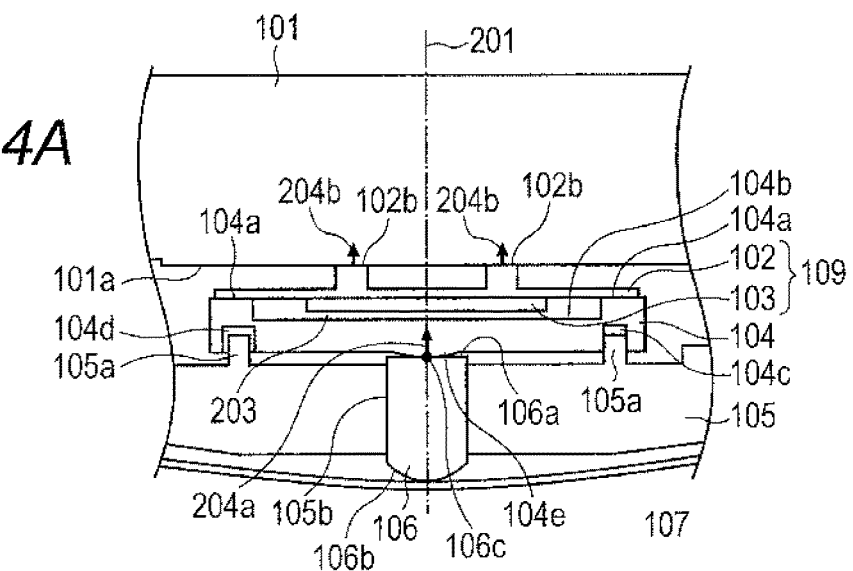
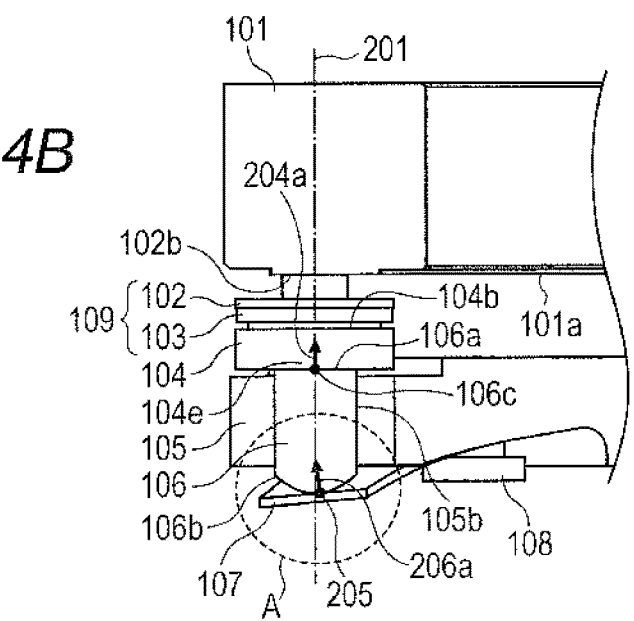
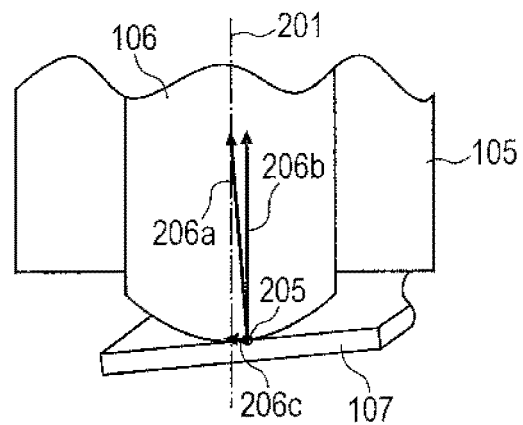
FIG. 4A
FIG. 4B
FIG. 4C

US 9,705,427 B2

ULTRASONIC MOTOR AND LENS APPARATUS INCLUDING THE SAME

BACKGROUND OF THE INVENTION

Field of the Invention

The present invention relates to an ultrasonic motor for driving a member to be driven by generating an ellipsoidal vibration on an impressed vibrator, and to a lens apparatus using the ultrasonic motor.

Description of the Related Art

An ultrasonic motor has been conventionally used as a driving source for driving, for example, a lens mechanism or a camera, taking advantage of silent operation, driving capability from low speed to high speed, and high torque output. For example, an ultrasonic motor disclosed in Japanese Patent Application Laid-Open No. 2006-158052 includes an annular member to be driven having a rotation axis, and multiple vibrators each including a contact part coming into contact with the annular member to be driven. The vibrator is retained in a state of being impressed against the member to be driven, rendering the contact part of the vibrator and the member to be driven in a so-called pressurized contact condition in which the contact part of the vibrator is pressurized against the member to be driven to bring them into contact with each other. When an ultrasonic vibration is excited on the vibrator under the pressurized contact condition, an ellipsoidal motion is generated on the contact part of the vibrator, so that the member to be driven is driven to rotate about the rotation axis of the member to be driven. The pressurized contact condition of the vibrator with respect to the member to be driven is obtained by biasing the vibrator against the member to be driven with use of a plate spring having a convex part for impressing the vibrator. The contact part of the vibrator comes into pressurized contact with the member to be driven in an appropriate state by impressing and biasing the vicinity of the center of the vibrator with a plate spring having the convex part for impressing the vibrator.

However, in the ultrasonic motor disclosed in Japanese Patent Application Laid-Open No. 2006-158052, there is a problem that the contact part of the vibrator and the member to be driven cannot come into pressurized contact in an appropriate state due to a manufacturing error or deformation of the plate spring.

In addition, in the ultrasonic motor disclosed in Japanese Patent Application Laid-Open No. 2006-158052, the convex part for impressing the vibrator is formed on the plate spring, and hence the convex part for impressing the vibrator and the contact part of the vibrator are likely to be shifted with respect to each other without keeping a consistent positional relationship therebetween due to an error between members, an assembling error, a manufacturing error, or deformation of the plate spring at the time of pressurization. Therefore, there is a problem that a direction of impression by the plate spring is deviated, so that a consistent contact condition cannot be maintained between the contact part of the vibrator and the member to be driven, and in some cases, a contact failure occurs.

Further, the contact parts of the vibrators are arranged in a driving direction of the member to be driven, and hence each vibrator is likely to be inclined in a direction perpendicular to the driving direction and parallel to the contact part of the vibrator rather than in the driving direction. The inclination of the vibrator may cause a problem that a partial contact occurs on the contact part, so that the contact part of the vibrator and the member to be driven cannot come into pressurized contact in an appropriate state.

SUMMARY OF THE INVENTION

The present invention has been made in order to solve the above-mentioned problem, and it is an object of the present invention to provide an ultrasonic motor capable of obtaining an appropriate pressurized contact condition between a contact part of a vibrator and a member to be driven.

An ultrasonic motor comprises: a member to be driven including a contact surface; a vibrator including at least one contact part that is brought into contact with the contact surface, and a piezoelectric element that is fixed on the vibrator, the vibrator being configured to drive the member to be driven by an ultrasonic vibration excited by the piezoelectric element; a retention part configured to retain the vibrator; and a pressurization unit including an elastic member so as to apply an impressing force on the at least one contact part against the member to be driven, in which: the retention part includes an abutting part including a line contact part that receives the impressing force from the elastic member and comes into line contact with the pressurization unit; the abutting part has a shape formed of a part of a cylinder; a center axis of the cylinder is parallel to the at least one contact part and perpendicular to a driving direction of the member to be driven.

According to the present invention, it is possible to provide the ultrasonic motor that drives the member to be driven by an ultrasonic vibration generated on the vibrator and is capable of obtaining an appropriate pressurized contact condition between the contact part of the vibrator and the member to be driven.

Further features of the present invention will become apparent from the following description of exemplary embodiments with reference to the attached drawings.

BRIEF DESCRIPTION OF THE DRAWINGS

FIG. 4A is an enlarged cross-sectional view for illustrating the assembled state of the members according to the first embodiment.

FIG. 4B is an enlarged cross-sectional view for illustrating the assembled state of the members according to the first embodiment.

FIG. 4C is an enlarged detail view of a portion A illustrated in FIG. 4B, for illustrating component vectors of an impressing force of an elastic member.

DESCRIPTION OF THE EMBODIMENTS

First Embodiment

Exemplary embodiments of the present invention are described below with reference to the accompanying drawings. Although a rotary driving type motor that is formed in a unit as a driving actuator of a lens barrel or the like for a digital camera is described as an example of an ultrasonic motor according to this embodiment, its usage is not limited to this.

Figure 1:
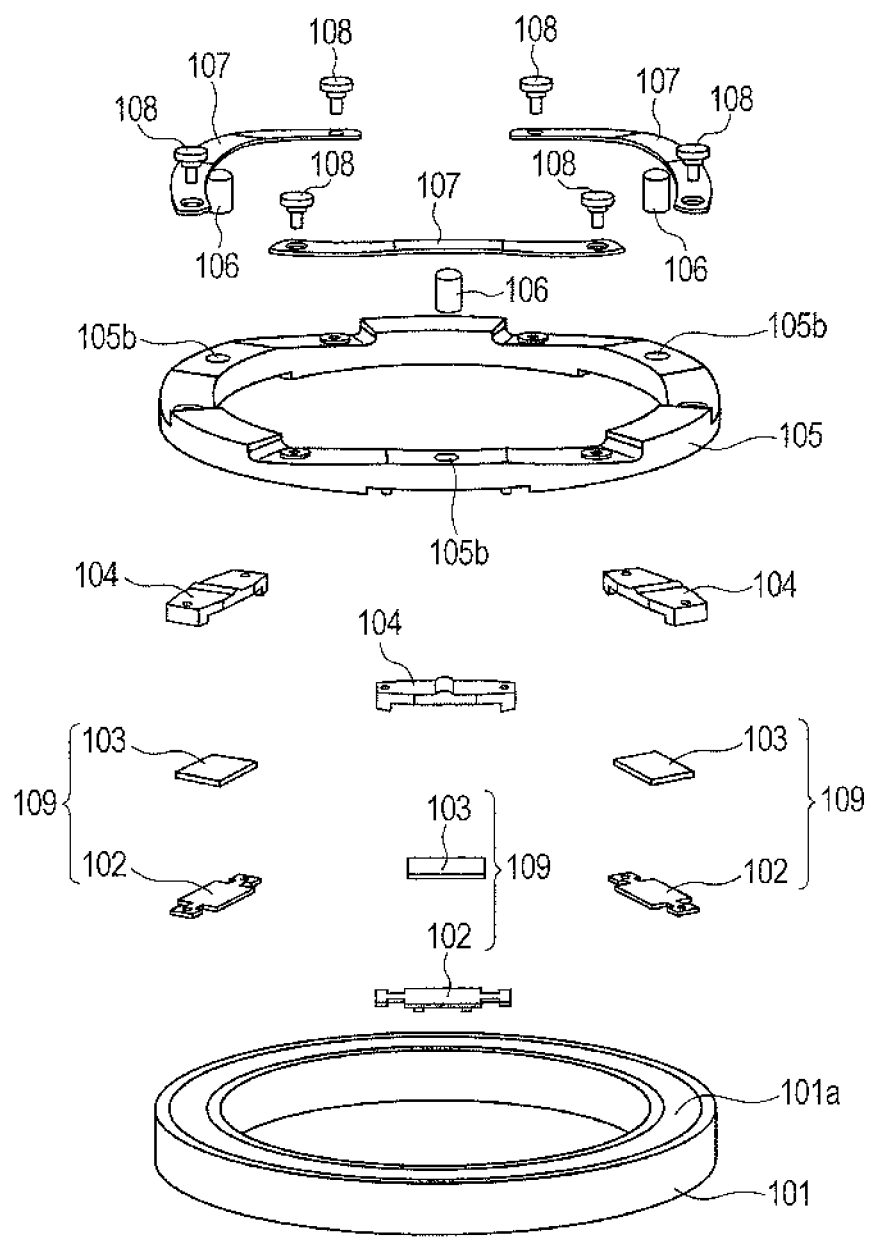
FIG. 1 is an exploded perspective view of an ultrasonic motor according to a first embodiment of the present invention.

FIG. 1 is an exploded perspective view of an ultrasonic motor according to an embodiment of the present invention. In the figures, the same members are represented by the same reference symbols. As illustrated in FIG. 1, the ultrasonic motor according to this embodiment includes a rotor 101, a vibration plate 102, a piezoelectric element 103, a smaller base 104, a ring base 105, a pressurization member 106, and a plate spring 107 described later. The rotor 101 is a member to be driven, including a contact surface 101a with which a vibrator 109 described later comes into pressurized contact. The vibration plate 102 is a part in contact with the contact surface 101a under a pressurized contact condition involving an impression. The piezoelectric element 103 is tightly adhered to the vibration plate 102 with an adhesive or the like. When a voltage is applied to the piezoelectric element 103 in a state in which the piezoelectric element 103 is tightly adhered to the vibration plate 102, an ultrasonic vibration is generated, so that an ellipsoidal motion can be generated on the vibration plate 102. The vibration plate 102 and the piezoelectric element 103 constitute the vibrator 109. In this embodiment, the vibrator 109 is provided at three points, thus driving the rotor 101 to rotate. The smaller base 104 is a retention member for retaining the vibrator 109. The ring base 105 is a fixing member for retaining the smaller base 104, and the pressurization member 106 and plate spring 107. The pressurization member 106 is fitted into a through hole part 105b of the ring base 105, and is retained to move only in a direction substantially perpendicular to the contact surface 101a of the rotor 101, thus causing the vibrator 109 to come into pressurized contact with the rotor 101 via the smaller base 104 by an impressing force from the plate spring 107. The plate spring 107 serves as an elastic member, which is fixed to the ring base 105 with a screw 108 at each end portion thereof, and causes the vibrator to come into pressurized contact with the member to be driven by an impressing force of the plate spring. The pressurization member 106 and the plate spring 107 constitute a pressurization unit of the present invention.

As described above, the above-mentioned members are assembled in a unit as an ultrasonic motor.

Figure 2:
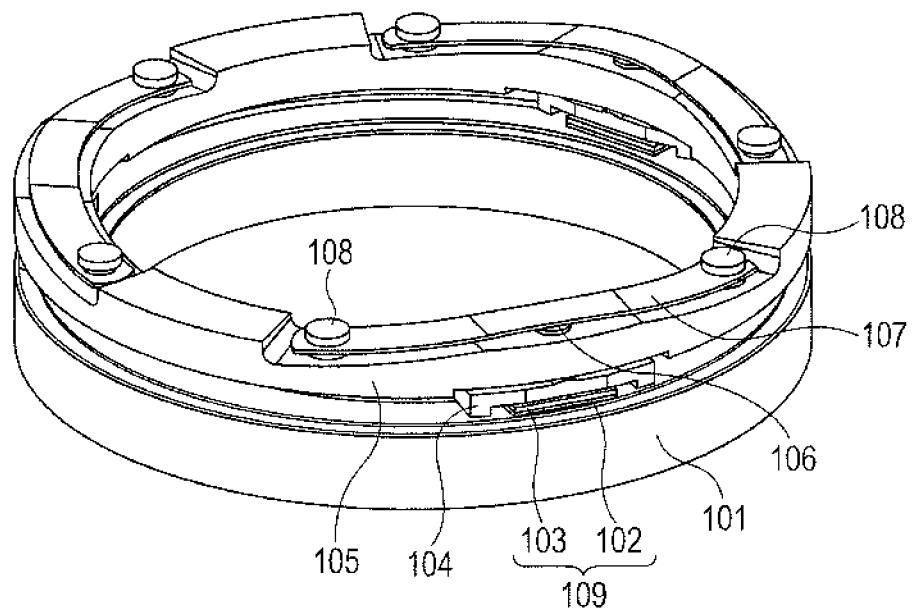
FIG. 2 is a perspective view for illustrating an assembled state of members illustrated in FIG. 1.

FIG. 2 is a perspective view for illustrating an assembled state of the members illustrated in FIG. 1. In FIG. 2, a configuration around the vibrator 109 is the same for all three points, and hence, to simplify the figure, the reference symbols are assigned only to a front side in the figure. As illustrated in FIG. 2, at each of the three points of the ring base 105, an impressing force is applied to the vibrator 109 by the plate spring 107 that is fixed with the two screws 108 via the pressurization member 106 and the smaller base 104, and as a result, the vibrator 109 and the contact surface 101a of the rotor 101 come into pressurized contact with each other. When actually mounting the ultrasonic motor on the lens barrel or the like, the rotor 101 is coupled to a focusing mechanism or a zoom mechanism for driving.

Figure 3:
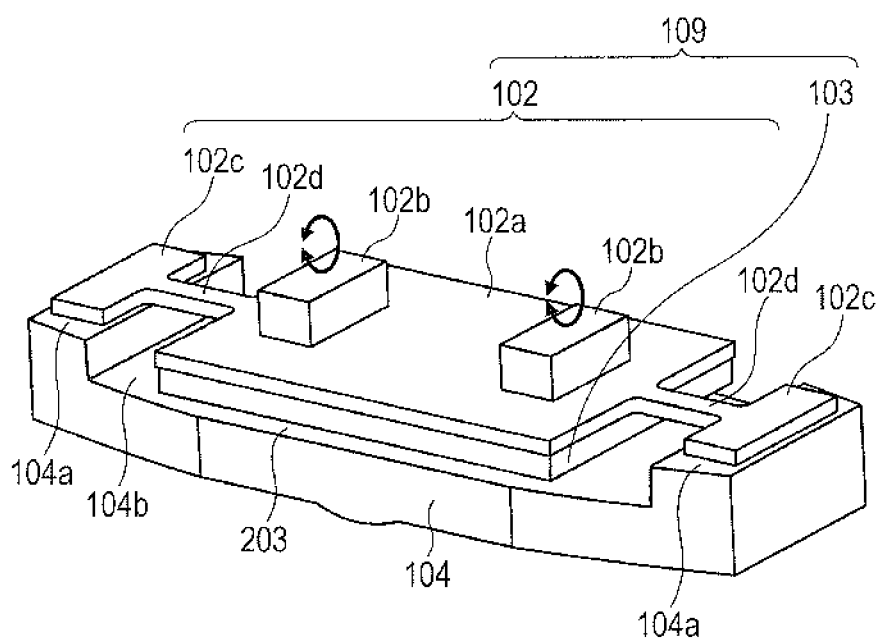
FIG. 3 is an enlarged perspective view for illustrating a joined state of a vibrator and a smaller base.

Hereinafter details on the structural members of the ultrasonic motor are described. FIG. 3 is an enlarged perspective view for illustrating a junction state of the vibration plate 102 and the smaller base 104 illustrated in FIGS. 1 and 2 as viewed from the rotor 101 side. As illustrated in FIG. 3, two protruded parts are formed on a plate part 102a at the center of the vibration plate 102. A protruded contact surface 102b is formed on an upper end surface of the protruded part and functions as a contact part that comes into contact with the contact surface 101a of the rotor 101. Two protruded contact surfaces 102b are formed on the same plane, and finished as uniform surfaces by polishing or the like at the time of manufacturing in order to ensure an appropriate contact condition with the contact surface 101a of the rotor 101.

On the other hand, the piezoelectric element 103 is tightly adhered to a back surface side of the plate part illustrated in FIG. 3 (a surface side opposite to the surface on which the two protruded parts are formed) with an adhesive or the like. The method of tightly adhering the piezoelectric element 103 to the back surface of the plate part 102a is not limited as long as the two components are tightly adhered to each other. The piezoelectric element 103 includes multiple piezoelectric element films laminated and integrated. An application of a desired alternate-current (AC) voltage to the piezoelectric element 103 formed by laminating the multiple piezoelectric element films causes a vibration, thus exciting two vibration modes on the vibration plate 102 having the piezoelectric element 103 tightly adhered thereto. At this time, by setting vibration phases of the two vibration modes to obtain a desired phase difference, an ellipsoidal motion is generated on the protruded contact surfaces 102b as indicated by arrows illustrated in FIG. 3. The ellipsoidal motion is generated on the vibrators 109 at the three points as illustrated in FIGS. 1 and 2 and transferred to the contact surface 101a of the rotor 101, so that the rotor 101 can be driven to rotate. Details on the above-mentioned laminated structure of the piezoelectric element and the above-mentioned vibration mode are substantially the same as the contents described in Japanese Patent Application Laid-Open No. 2004-304887. The entire content of Japanese Patent Application Laid-Open No. 2004-304887 is hereby incorporated by reference as if presented herein in its entirety.

Two junction parts 102c for joining to higher upper surface parts 104a formed on both sides of the smaller base 104 are formed on both ends of the vibration plate 102. Although the vibration plate 102 is joined to the smaller base 104 by welding or adhering at the junction part 102c, the method of joining the vibration plate 102 and the smaller base 104 is not limited as long as the vibration plate 102 and the smaller base 104 are joined to each other. Two arm parts 102d are formed respectively between the two junction parts 102c and the plate part 102a, and the plate part 102a to which the piezoelectric element 103 is tightly adhered is fixed to the smaller base 104 via the arm parts 102d. The arm parts 102d are formed into a narrower shape than the plate part 102a and the junction part 102c as illustrated in FIG. 3 to achieve such a configuration that hardly transfers the vibration generated on the plate part 102a to the junction part 102c. In other words, a coupling configuration for preventing the vibration generated on the plate part 102a from being interrupted by the smaller base 104 that is a rigid member is achieved by the arm parts 102d. In addition, a predetermined space 203 is formed between a flat part 104b near the center of the smaller base 104 and a surface (not shown) of the piezoelectric element 103 facing the flat part 104b.

FIGS. 4A and 4B are enlarged cross-sectional views for illustrating the assembled state of the members, in which the rotor 101 is located on the upper side and only a surrounding area of one of the three vibrators 109 illustrated in FIG. 2 is illustrated in an enlarged manner. The other two vibrators have the same configuration, and a description thereof is omitted.

FIG. 4A illustrates a cutting plane on a plane that is parallel to the driving direction of the rotor 101 and includes a center of gravity of a whole protruded contact surface including the two protruded contact surfaces 102b coming into contact with the contact surface 101a of the rotor 101 and a normal line of the contact surface 101a of the rotor 101 originating at the center of gravity.

FIG. 4B illustrates a cutting plane on a plane including a center of gravity of the whole protruded contact surface coming into contact with the contact surface 101a in the vibration plate 102 illustrated in FIG. 3 and a normal line of the contact surface 101a, and perpendicular to the view illustrated in FIG. 4A.

However, the whole protruded contact surface is a surface including all the protruded contact surfaces 102b, and includes the two protruded contact surfaces 102b in the example illustrated in FIG. 4A. In addition, the center of gravity of the whole protruded contact surface (hereinafter, also referred to as a "whole contact gravity center part") also includes an intersection point of a center line 201 described later with the contact surface 101a.

In FIGS. 4A and 4B, the center line 201 is a line passing through the center of gravity of the whole protruded contact surface coming into contact with the contact surface 101a in the vibration plate 102 and including the normal line of the contact surface 101a.

The protruded contact surfaces 102b come into contact with the contact surface 101a of the rotor 101, and are held in a pressurized contact condition. In addition, the junction parts 102c on both ends of the vibration plate 102 are joined to the smaller base 104 at the two upper surface parts 104a. The predetermined space 203 is then formed between the piezoelectric element 103 and the flat part 104b of the smaller base 104.

A hole part 104c and an elongated hole part 104d are provided on the lower surface side of the smaller base 104, and two shaft parts 105a formed on the ring base 105 are respectively fitted therein. An abutting part 104e is provided on the lower center of the smaller base 104. The abutting part 104e has an arc shape in cross section illustrated in FIG. 4A, which is a part of a cylinder extending in a direction of the depth of the drawing sheet (a lateral direction in FIG. 4B). An upper end surface 106a of the pressurization member 106 comes into contact with the abutting part 104e at a line contact part 106c. The upper end surface 106a is formed as a flat surface, and hence the contact with the abutting part 104e at the line contact part 106c is a line contact having a length in the direction of the depth of the drawing sheet in FIG. 4A (the lateral direction in FIG. 4B). Although the abutting part 104e is a part of a shape formed of a cylinder having an arc shape as described above in this embodiment, the shape of the abutting part 104e is described later in detail with reference to FIGS. 5A, 5B, and 5C.

The ring base 105 includes the through hole part 105b on a surface facing the plate spring 107 as illustrated in FIG. 1, and the pressurization member 106 comes into contact with the plate spring 107 by being fitted in the through hole part 105b, thus cooperating with the plate spring 107. The center axes of the through hole part 105b and the pressurization member 106 substantially match the center line 201, i.e., an axial direction perpendicular to the contact surface 101a. The plate spring 107 is deformed to come into contact with a spherical surface part 106b on the lower side of the pressurization member 106 in FIGS. 4A and 4B in a state in which the pressurization member 106 is biased against the smaller base 104 by an elastic force.

The plate spring 107 needs to have a reduced spring constant to some extent in order to reduce a fluctuation of the impressing force due to a change of a deformation amount. Therefore, it is desired that the plate spring 107 be as thin as possible and the plate spring 107 be as long as possible. The plate spring 107 according to this embodiment is formed with use of a thin plate into an arc shape in order to achieve as large a spring length as possible in the annular ultrasonic motor. With this structure, the fluctuation of the impressing force can be suppressed even when a displace amount of the pressurization member 106 in the impressing direction is changed to some extent. With the above-mentioned configuration, the vibrator 109 is impressed against the rotor 101 by the plate spring 107 via the smaller base 104 and the pressurization member 106.

A configuration for transferring the impressing force by the plate spring 107 is described below with reference to FIGS. 4A, 4B, and 4C. In the following description, an impressing force vector is a force vector including a direction and a magnitude of the impressing force in the cross section of each figure.

As illustrated in FIG. 4A, the abutting part 104e of the smaller base 104 is held in contact with the pressurization member 106 at the line contact part 106c. The smaller base 104 is further held in contact with the rotor 101 at the protruded contact surfaces 102 of the two protruded parts, and the center of gravity of each protruded contact surface is located at the same distance from the center line 201 in the driving direction of the rotor. On the other hand, regarding the contact between the plate spring 107 and the pressurization member 106, the plate spring 107 is formed into an arc shape in this embodiment, and hence, the support parts on both ends of the plate spring 107 and an input point of the impressing force (a contact point between the plate spring 107 and the pressurization member 106) do not exist on a straight line. Therefore, a cross section of the plate spring 107 when generating the impressing force is in a state having an inclination as illustrated in FIG. 4B. In that case, as a result, the impressing force vector input to the pressurization member 106 by the plate spring 107 can be indicated by an arrow (vector) 206a. The contact point between the pressurization member 106 and the plate spring 107 does not exist on the center line 201, and in FIG. 4B, the contact point is shifted to a point 205 on the right side of the center line 201.

FIG. 4C is an enlarged detail view of a vicinity of the point 205 in a portion A illustrated in FIG. 4B. The impressing force applied to the pressurization member 106 by the plate spring 107 is represented by the vector 206a, which is inclined with respect to the center line 201. Therefore, the impressing force vector 206a includes a component vector 206b in a direction parallel to the center line 201 and a component vector 206c in a direction perpendicular to the center line 201.

The pressurization member 106 is retained by the ring base 105 with a degree of freedom only in a direction substantially parallel to the center line 201 as illustrated in FIGS. 4A and 4B. That is, the pressurization member 106 is configured to move in a direction substantially perpendicular to the contact surface 101a of the rotor 101, and on the other hand, the pressurization member 106 is restricted to move in a direction substantially parallel to the contact surface 101a of the rotor 101. Therefore, in the impressing force (vector 206a) of the plate spring 107 for impressing the pressurization member 106, a force (vector 204a) corresponding to a component (vector 206b) in the direction of the center line 201 is transferred to the smaller base 104.

On the other hand, the impressing force (vector 204a) transferred to the smaller base 104 is transferred to the protruded contact surfaces 102b of the two protruded parts as an impressing force for the contact surface 101a of the rotor, and a force of impressing the contact surface 101a by each of the protruded contact surfaces 102b is a half (vector 204b) of the impressing force vector 204a.

The contact between the protruded contact surfaces 102b and the contact surface 101a is a surface contact, and hence, in practice, the impressing force is evenly distributed on the plane. However, for the sake of better understanding, the impressing force is represented as a force vector acting on a position of the center of gravity of the plane. Likewise, the contact between the pressurization member 106 and the abutting part 104e at the line contact part 106c is a line contact, and hence, in practice, the impressing force is evenly distributed on the straight line of line contact. However, the impressing force is also represented as a force vector acting on a position of the center of gravity of the straight line. Hereinafter, the impressing force is represented as a force vector at the position of the center of gravity for both the surface contact and the line contact.

In addition, on a side surface part of the pressurization member 106, a frictional force is generated by the component vector 206c of the impressing force vector 206a input to the pressurization member 106 by the plate spring 107, the component vector 206c acting in the direction perpendicular to the center line 201. On the other hand, a frictional force is also generated on the fitting parts of the shaft parts 105a. These frictional forces are ignored because these are sufficiently small with respect to the impressing force. In practice, if the finishing of the side surface is smoothened to some extent, an influence of the frictional forces can be reduced to a level that can be ignored.

In this embodiment, as described above, the pressurization member 106 is substantially retained on the ring base 105 in a state of having a degree of freedom only in the direction of the center line 201. Therefore, the impressing force vector 204a applied to the smaller base 104 by the pressurization member 106 can be substantially matched with the center line 201. At this time, the magnitude of the impressing force vector 204a is substantially equal to the component vector 206b of the impressing force vector 206a by the plate spring 107 in the direction parallel to the center line 201. This is because a force corresponding to the component vector 206b of the impressing force vector 206a works as the impressing force vector 204a. The component vector 206c of the impressing force vector 206a in the direction perpendicular to the center line 201 affects the frictional force on the side surface part of the pressurization member 106. Through the smooth finishing of the surfaces, the frictional force generated between the side surface of the pressurization member 106 and an internal surface of the through hole part 105b is sufficiently small compared to the impressing force, and does not interfere with a smooth reciprocating movement of the pressurization member 106. In this manner, as illustrated in FIGS. 4A and 4B, the point of load of the input impressing force vector 206a is shifted from the center line 201, and the direction of the impressing force vector 206a is not parallel to the center line 201, but the two protruded contact surfaces 102b can maintain an appropriate pressurized contact condition with respect to the contact surface 101a of the rotor 101.

By the way, the smaller base 104 is impressed via the line contact part on a straight line of the abutting part 104e. Therefore, as described later, in the cross section illustrated in FIG. 4A, the smaller base 104 is configured to be inclined, so that an appropriate pressurized contact condition can be maintained even when inclination of a member occurs due to a dimension error at the time of manufacturing, an assembling error, or a disturbance.

Figure 5A:
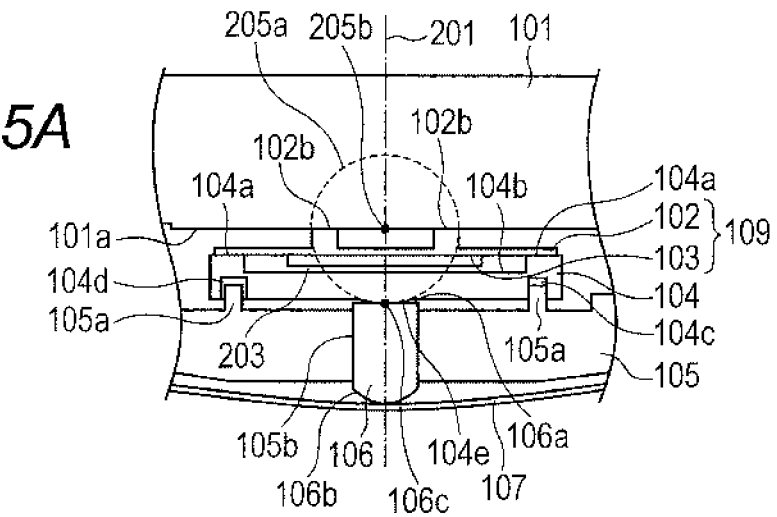
FIG. 5A is an explanatory view for illustrating an abutting part of the smaller base, which is formed of a part of a cylinder.
Figure 5B:
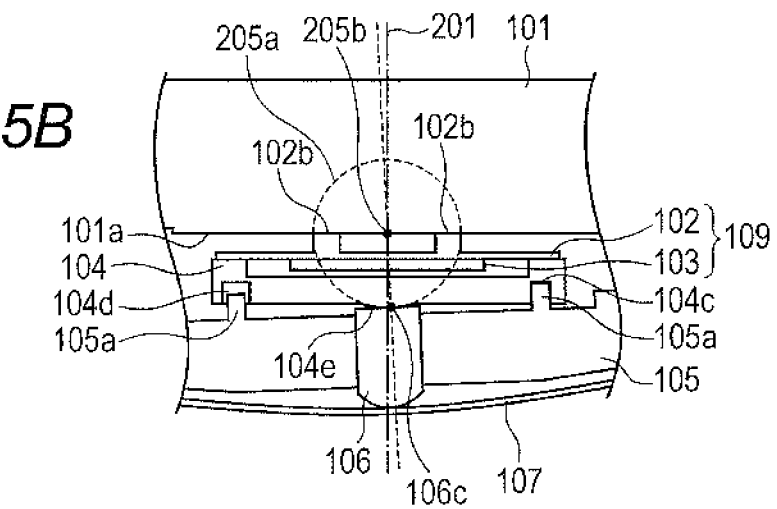
FIG. 5B is a view for illustrating a case where a rotor and a ring base are inclined in a relative manner.
Figure 5C:
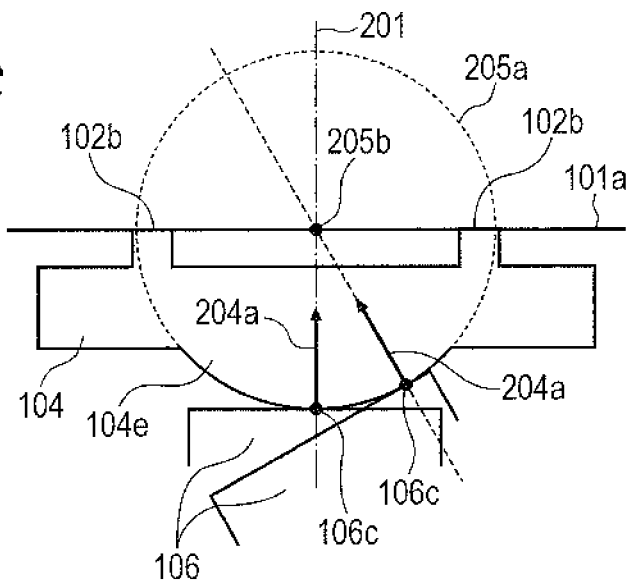
FIG. 5C is a schematic view for illustrating a positional relationship between a center axis of the cylinder forming the abutting part and a line contact part between the abutting part and a pressurization member.

A shape of the abutting part 104e of the smaller base 104 to which an impressing force is applied from the pressurization member 106 is described with reference to FIGS. 5A, 5B, and 5C. FIGS. 5A, 5B, and 5C illustrate a portion of the same cross section as that illustrated in FIG. 4A.

The abutting part 104e of the smaller base 104 is formed as an arc side surface part formed of a part of a cylinder 205a extending with an axis of symmetry (center axis) in a direction perpendicular to the cross section illustrated in FIG. 5A. In FIG. 5A, a center axis 205b of the cylinder 205a passes through a point at which the contact surface 101a of the rotor 101 and the center line 201 intersect with each other, i.e., the center of gravity of the whole protruded contact surface. The abutting part 104e comes into contact with the pressurization member 106 at the line contact part 106c. In FIG. 5A, the line contact part 106c intersects with the center line 201. With the above-mentioned configuration, a uniform impressing force can be applied between the two protruded contact surfaces 102b and the contact surface 101a of the rotor 101, and as a result, an appropriate pressurized contact condition can be maintained.

FIG. 5B illustrates a case where relative inclination occurs between the rotor 101 and the ring base 105 compared to the state illustrated in FIG. 5A. FIG. 5C is an enlarged view in which an inclination angle is represented in an exaggerated manner for illustrating a positional relationship between the center axis 205b of the cylinder 205a and the line contact part 106c when the inclination occurred. In the case illustrated in FIG. 5B, the line contact part 106c at which the contact surface 106a of the pressurization member 106 comes into contact with the abutting part 104e of the smaller base 104 is, as illustrated in FIG. 5C, shifted from the position intersecting with the center line 201 in the case illustrated in FIG. 5A. However, the impressing force applied to the whole protruded contact surface via the abutting part 104e is constantly directed to the direction of the center of gravity of the whole protruded contact surface. Therefore, even in the case where relative inclination occurs between the rotor 101 and the ring base 105, a uniform impressing force can be applied between the two protruded contact surfaces 102b and the contact surface 101a of the rotor 101 without generating a moment between the two protruded contact surfaces 102b, and therefore, an appropriate pressurized contact condition can be maintained. Although the ring base 105 is fitted into the smaller base 104 via the hole part 104c, the elongated hole part 104d, and the shaft part 105a, the inclination can occur because a fitting clearance, i.e., a fitting space is provided.

An amount of the fitting space necessary for the inclination can be set in advance based on the maximum necessary inclination angle for the inclination of the member due to an error between members, a dimension error at the time of manufacturing, an assembling error, or a disturbance. The center axis 205b of the cylinder 205a indicated by a dotted line that forms the abutting part 104e is set to match a center point between the centers of gravity of the two protruded contact surfaces 102b, i.e., the center of gravity of the whole protruded contact surface described above. With this configuration, the normal line of the contact surface 106a of the pressurization member 106 on the line contact part 106c is constantly directed to the direction of the center axis 205b of the cylinder 205a. As a result, the direction of the normal line of the contact surface 106a (the direction of the impressing force) at the contact position of the pressurization member 106 and the smaller base 104 can be constantly directed to the center point between the two protruded contact surfaces 102b on the contact surface 101a of the rotor 101, and therefore, the impressing forces between the two protruded contact surfaces 102b and the contact surface 101a of the rotor 101 can be maintained uniform.

Therefore, even when inclination occurs due to an error between members of the rotor 101 and the ring base 105, a dimension error at the time of manufacturing, or an assembling error, or when inclination occurs on a member due to a vibration at the time of driving or a disturbance, the impressing force applied from the pressurization member 106 via the abutting part 104e to the two protruded contact surfaces 102b and the contact surface 101a of the rotor 101 is constantly directed to the center axis 205b of the cylinder 205a with respect to the inclination, and hence a stable pressurized contact condition can be maintained between the two protruded contact surfaces 102b and the contact surface 101a of the rotor 101.

In the cross section illustrated in FIG. 4B, the smaller base 104 and the pressurization member 106 are not inclined with respect to each other in a lateral direction of FIG. 4B through the contact of the abutting part 104e of the smaller base 104 and the pressurization member 106 that is set as a line contact of a straight line.

In addition, in the two protruded contact surfaces 102b on the cross section of FIG. 4A, the width of the protruded contact surface 102b on the cross section illustrated in FIG. 4B is sufficiently smaller compared to the width between edge parts of the protruded contact surface 102b in the driving direction of the rotor 101, and hence the vibrator 102 is likely to be inclined unintentionally in the lateral direction of FIG. 4B at the time of rotary driving, possibly leading to degradation of the pressurized contact condition. Therefore, in this embodiment, the length of the line contact part 106c at which the pressurization member 106 comes into contact with the abutting part 104e of the smaller base 104 on the cross section illustrated in FIG. 4B is set to be longer than the width of the protruded contact surface 102b on the cross section illustrated in FIG. 4B to support the vibrator 102, with the result that the inclination hardly occurs.

Figure 6A:
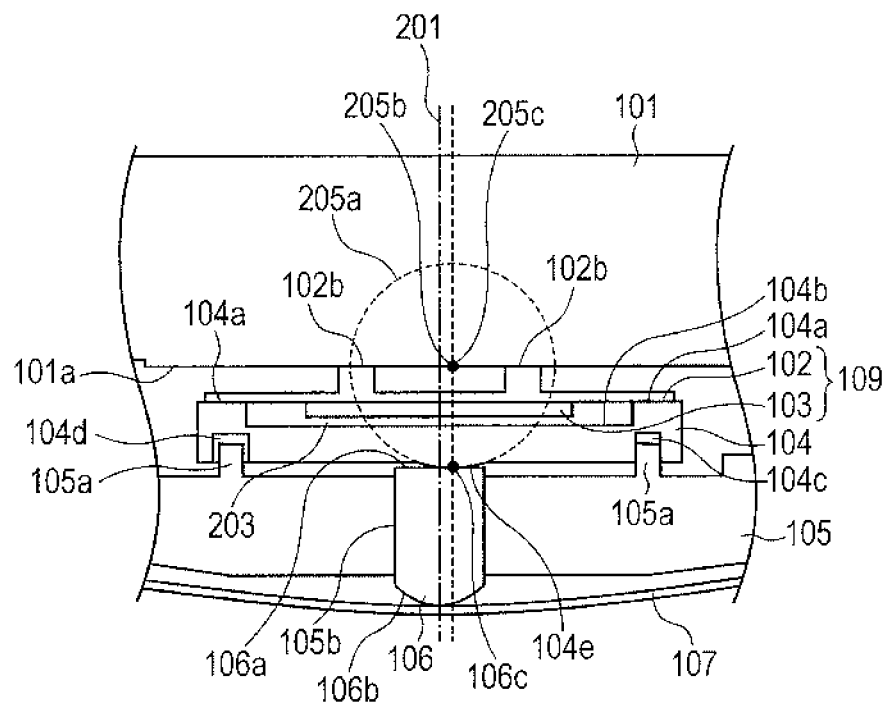
FIG. 6A is a view for illustrating a case where the center axis of the cylinder is shifted compared to FIGS. 5A to 5C.
Figure 6B:
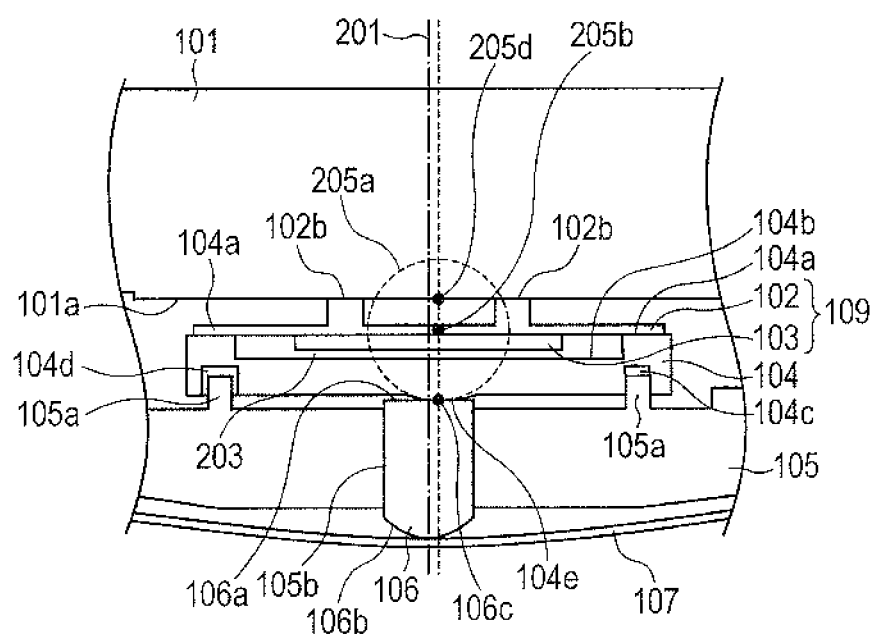
FIG. 6B is a view for illustrating a case where the center axis of the cylinder is shifted compared to FIGS. 5A to 5C.

FIGS. 6A and 6B illustrate a case where the center axis 205b of the cylinder 205a does not pass through the center point between the centers of gravity of the two protruded contact surfaces 102b, i.e., the center of gravity of the whole protruded contact surface, but passes nearby. FIGS. 6A and 6B illustrate a portion of the same cross section as that illustrated in FIGS. 5A, 5B, and 5C.

In FIGS. 5A, 5B, and 5C, the center axis 205b of the cylinder 205a passes through the center of gravity of the whole protruded contact surface. However, there is a case where the center axis 205b of the cylinder 205a is hard to pass through the center of gravity of the whole protruded contact surface due to various constraint conditions in manufacturing and assembling. In such a case, as illustrated in FIG. 6A, the center axis 205b is caused to pass through a dividing point 205c of a line connecting the edge parts of the two protruded contact surfaces 102b near the center point in the driving direction of the rotor 101. Accordingly, it is possible to maintain a state of biasing the two protruded contact surfaces 102b and the contact surface 101a of the rotor 101 by distributing the impressing force from the pressurization member 106 at a constant ratio. In the configuration illustrated in FIG. 6A, even when relative inclination occurs between the rotor 101 and the ring base 105 as illustrated in FIGS. 5B and 5C, the impressing force from the pressurization member 106 is constantly directed to the center axis 205b of the cylinder 205a. Therefore, it is possible to maintain the state in which the impressing force from the pressurization member 106 is applied by being distributed at the constant ratio between the two protruded contact surfaces 102b.

FIG. 6B illustrates a case where the center axis 205b of the cylinder 205a is shifted in any one of upper, lower, left, and right directions of the drawing sheet from the center point between the centers of gravity of the above-mentioned two protruded contact surfaces 102b, i.e., the center of gravity of the whole protruded contact surface due to various constraint conditions in manufacturing and assembling. In this case, a straight line including the line contact part 106c and the center axis 205b of the cylinder 205a on the cross section illustrated in FIG. 6B is configured to intersect the contact surface 101a of the rotor 101 at a dividing point 205d of a line connecting the edge parts of the two protruded contact surfaces 102b in the driving direction of the rotor 101. With this configuration, the impressing force from the pressurization member 106 is constantly applied between the two protruded contact surfaces 102b, and hence the pressurized contact condition can be maintained without causing a contact error between the two protruded contact surfaces 102b and the contact surface 101a of the rotor 101. In addition, also in the configuration illustrated in FIG. 6B, when relative inclination occurs between the rotor 101 and the ring base 105 as illustrated in FIGS. 5B and 5C, the above-mentioned straight line is configured to intersect the contact surface 101a of the rotor 101 at the dividing point 205d of the line connecting the edge parts of the two protruded contact surfaces 102b in the driving direction of the rotor 101. Therefore, the impressing force from the pressurization member 106 is constantly applied between the two protruded contact surfaces 102b, and as a result, the pressurized contact condition can be maintained without causing a contact error between the two protruded contact surfaces 102b and the contact surface 101a of the rotor 101.

As described above, in this embodiment, the abutting part 104e of the smaller base 104 that retains the vibrator 109, which is a plane receiving the impressing force, is formed into a shape formed of a part of the cylinder 205a about the center axis 205b that passes near the center point between the two protruded contact surfaces 102b, and hence an ultrasonic motor can be realized which can maintain an appropriate pressurized contact condition between the protruded contact surfaces 102b of the vibrator 109 and the contact surface 101a of the rotor 101.

Although the configuration in which the two protruded contact surfaces 102b achieve the pressurized contact condition between the two protruded contact surfaces 102b and the contact surface 101a of the rotor 101 is described in this embodiment, the present invention is not limited to this configuration.

A single protruded contact surface 102b may be provided. When a single protruded contact surface is provided, the whole protruded contact surface is the same as the single contact surface. A center of gravity of the single contact surface is matched substantially on the center line 201. With this configuration, an appropriate pressurized contact condition can be maintained. In addition, three or more protruded contact surfaces may be provided. When three or more protruded contact surfaces are provided, in the same manner as the case where the two protruded contact surfaces are provided, a center of gravity of the whole protruded contact surface including the three or more protruded contact surfaces is matched substantially on the center line 201. With this configuration, an appropriate pressurized contact condition can be maintained.

In addition, even when multiple protruded contact surfaces are provided and shapes of the protruded contact surfaces are different from one another, a center of gravity of the whole protruded contact surface including the multiple protruded contact surfaces is matched substantially on the center line 201. With this configuration, an appropriate pressurized contact condition can be maintained, and the effect of the present invention can be achieved.

Second Embodiment

A second embodiment of the present invention is a modification example of the first embodiment, in which the three plate springs 107 corresponding to the three pressurization members 106 are integrally formed. With this configuration, the number of plate springs 107 and screws 108 can be reduced, achieving an effect of cost reduction.

Figure 7:
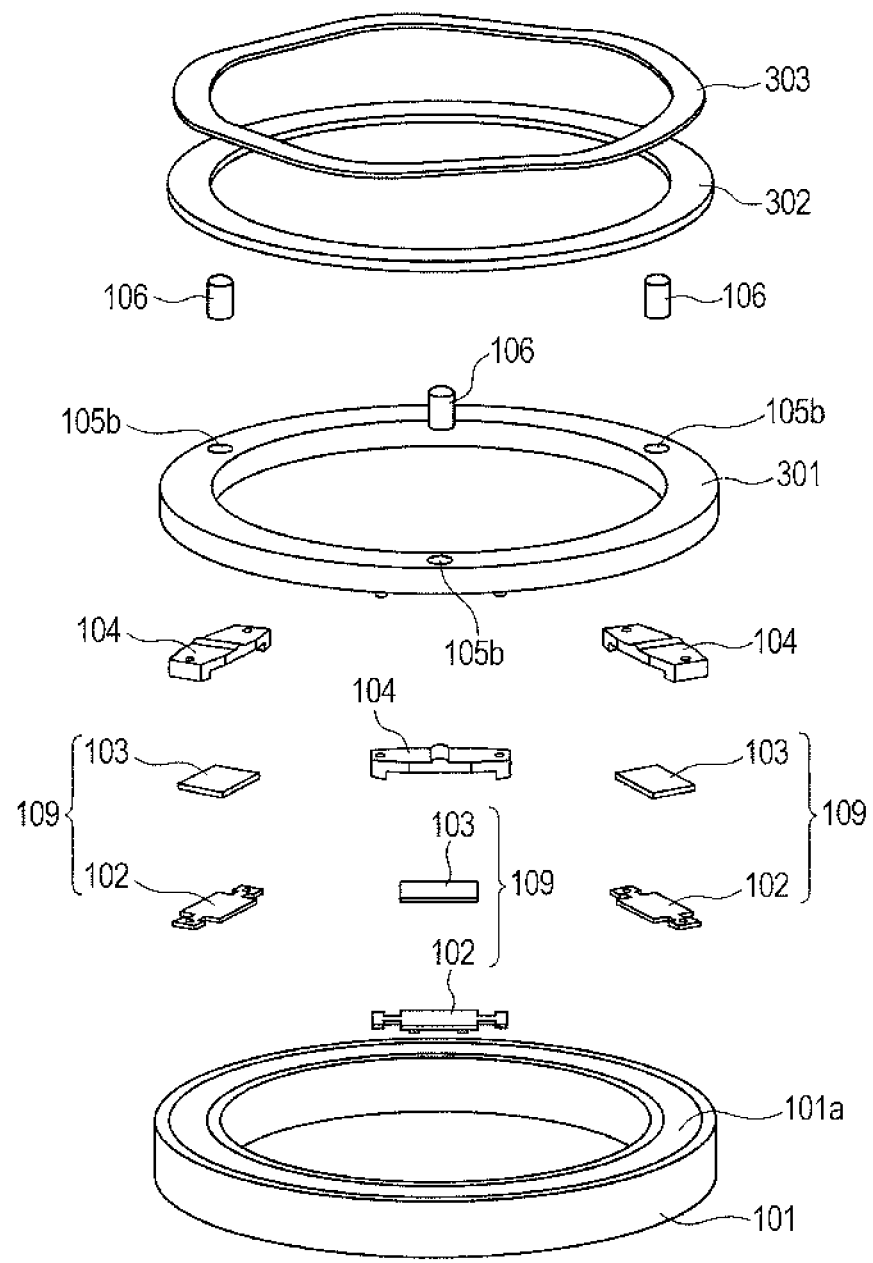
FIG. 7 is an exploded perspective view of an ultrasonic motor according to a second embodiment of the present invention.

FIG. 7 is an exploded perspective view of an ultrasonic motor according to the second embodiment of the present invention. In the figure, the same members are represented by the same reference numerals, and the same members as those of the first embodiment are also represented by the same reference numerals. In the second embodiment, a ring base 301 only includes shaft parts 105a for positioning the smaller base 104 and through hole parts 105b for respectively fitting the pressurization members 106 therein. A washer 302 is retained in contact with the three pressurization members 106. A wave washer 303 is provided to impress the washer 302. A fixing unit (not shown) is provided on the upper side of the wave washer 303, and by sandwiching the wave washer 303 between the fixing unit and the washer 302, a wave form of the wave washer 303 is depressed by a predetermined amount to generate an impressing force.

Figure 8:
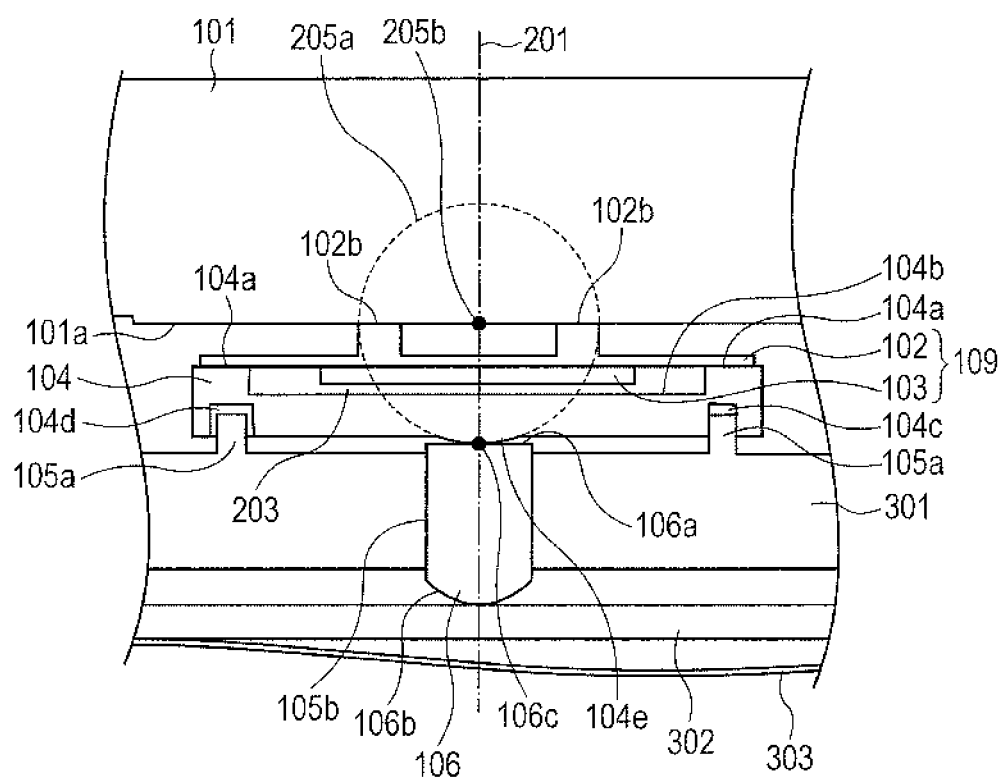
FIG. 8 is an enlarged cross-sectional view for illustrating an assembled state of members illustrated in FIG. 7.

FIG. 8 is an enlarged cross-sectional view for illustrating an assembled state of members according to the second embodiment. In FIG. 8, the wave washer 303 is depressed by the predetermined amount, and the impressing force is transferred to the pressurization member 106 via the washer 302. A configuration of transferring the impressing force in the subsequent stage is the same as that of the first embodiment.

By the way, in the first embodiment, the plate spring 107 is fixed on the ring base 105, and hence an absolute position of the ring base 105 in the direction of the center line 201 in FIGS. 4A and 4B is determined depending on a deformation amount of the plate spring 107. However, in the second embodiment, the ring base 301 only takes a role of retaining the smaller base 104 and the pressurization member 106, and the wave washer 303 is not fixed. Thus, the position of the ring base 301 in the direction of the center line 201 is not determined. Therefore, when mounting the ultrasonic motor according to the second embodiment to a lens barrel or the like, the ring base 301 may be fixed to have a desired absolute position with respect to a fixed cylinder in the barrel, so that the ring base 301 does not move unintentionally. Alternatively, the ring base 301 may be integrated with the fixed barrel depending on the configuration.

Therefore, in the second embodiment, the single wave washer 303 is commonly used as the elastic member for impressing the three pressurization members 106, and hence there is no need for the plate spring and the screw, achieving the cost reduction.

Third Embodiment

According to a third embodiment of the present invention, a lens apparatus having the effect of the present invention can be achieved by employing the ultrasonic motor according to the first or second embodiment as a driving unit for driving a focusing lens or a zoom lens in the lens apparatus.

As described above, in the ultrasonic motor that drives the member to be driven by an ultrasonic vibration generated on the vibrator, an appropriate pressurized contact condition can be achieved between the abutting part of the vibrator and the part to be contacted by causing the center axis of the shape formed of a part of a cylinder forming the contact part of the smaller base to pass near the whole contact gravity center part.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-204002, filed Sep. 20, 2011, which is hereby incorporated by reference herein in its entirety.

What is claimed is:

1. A driving motor, comprising:
   a member including a contact surface;
   a vibrator including a contact part that is brought into contact with the contact surface, wherein the vibrator and the member move relatively by a vibration of the vibrator;
   a pressing unit comprising an elastic member so as to apply a pressing force on the contact part against the member including the contact surface; and
   a contact member configured to be located between the pressing unit and the vibrator,
   wherein the contact member has a curved surface portion formed as an arc shape curved toward the pressing unit, and the contact member comes into contact with the pressing unit at the curved surface portion, and
   the curved surface portion is formed so as to locate a position of a center of a circle including the arc shape of the curved surface portion not closer to the contact member than to the contact part.

2. A driving motor according to claim 1, wherein the curved surface portion has the arc shape formed of part of a cylinder; and
   a center axis of the cylinder is parallel to the contact part and perpendicular to a relative moving direction.

3. A driving motor according to claim 1, wherein the elastic member is a plate spring.

4. A driving motor according to claim 1, wherein the elastic member is a wave washer.

5. A driving motor according to claim 1, wherein the driving motor is an ultrasonic motor.

6. A lens apparatus, comprising the driving motor according to claim 1.

7. A driving motor according to claim 2, wherein the center axis is located not closer to the contact member than to the contact part.

8. A driving motor according to claim 2, wherein the center axis is located on the contact surface.

* * * * *